(12) United States Patent
Tazarine et al.

(10) Patent No.: US 11,239,039 B2
(45) Date of Patent: Feb. 1, 2022

(54) ELECTRIC FUSE ELEMENT, AND METHOD FOR OPERATING AN ELECTRIC FUSE ELEMENT

(71) Applicant: Auto-Kabel Management GmbH, Hausen i.W. (DE)

(72) Inventors: Wacim Tazarine, Erkelenz (DE); David Cacciatore, Krefeld (DE); Sohejl Rafati, Mönchengladbach (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 16/758,146

(22) PCT Filed: Sep. 17, 2018

(86) PCT No.: PCT/EP2018/075032
§ 371 (c)(1),
(2) Date: Apr. 22, 2020

(87) PCT Pub. No.: WO2019/081128
PCT Pub. Date: May 2, 2019

(65) Prior Publication Data
US 2020/0286703 A1  Sep. 10, 2020

(30) Foreign Application Priority Data
Oct. 27, 2017  (DE) ..................... 10 2017 125 208.8

(51) Int. Cl.
*H01H 89/00* (2006.01)
*H01H 85/02* (2006.01)
(Continued)

(52) U.S. Cl.
CPC ........... *H01H 89/00* (2013.01); *B60R 16/033* (2013.01); *H01H 39/004* (2013.01);
(Continued)

(58) Field of Classification Search
CPC .... H01H 89/00; H01H 39/004; H01H 39/006; H01H 85/0241; H01H 2039/008; B60R 16/033; H02H 3/033; B60L 3/04
(Continued)

(56) References Cited

U.S. PATENT DOCUMENTS 3,763,454 A * 10/1973 Zandonatti ........... H01H 37/761
                                                                337/404
3,828,289 A *  8/1974 Hickling ................ H01H 85/46
                                                                337/5
(Continued)

FOREIGN PATENT DOCUMENTS

CN  101902027 A   12/2010
CN  102834889 A   12/2012
(Continued)

OTHER PUBLICATIONS

China National Intellectual Property Administration, First Office Action, Application No. 201880070107.X, dated Sep. 24, 2021, 10 pages (English translation).

*Primary Examiner* — Anatoly Vortman
(74) *Attorney, Agent, or Firm* — Sunstein LLP

(57) ABSTRACT

Electrical fuse element 12 comprising a switchable load path 22 and a switchable fuse path 36, wherein the load path 22 and the fuse path 36 are short-circuited with their respective inputs 14. The load path 22 and the fuse path 36 are in mechanical connection with each other in such a way that an electrical opening of the load path 22 causes an electrical closing of the fuse path 36 and that a melting fuse 38 arranged in the fuse path 36 is triggered at the moment of closing of the fuse path 36.

8 Claims, 3 Drawing Sheets

(51) Int. Cl.
  *H01H 39/00* (2006.01)
  *B60R 16/033* (2006.01)
  *B60L 3/04* (2006.01)
  *H02H 3/033* (2006.01)

(52) U.S. Cl.
  CPC ...... *H01H 39/006* (2013.01); *H01H 85/0241* (2013.01); *B60L 3/04* (2013.01); *H01H 2039/008* (2013.01); *H02H 3/033* (2013.01)

(58) Field of Classification Search
  USPC ............................................. 337/6, 157, 165
  See application file for complete search history.

(56) References Cited

U.S. PATENT DOCUMENTS

| | | | | |
|---|---|---|---|---|
| 3,958,206 A * | 5/1976 | Klint | ............ | H01H 39/00 337/406 |
| 4,224,487 A * | 9/1980 | Simonsen | ............ | H01H 39/006 200/61.08 |
| 5,535,842 A * | 7/1996 | Richter | ............ | B60K 28/14 180/271 |
| 5,793,275 A * | 8/1998 | Iversen | ............ | H01H 85/055 337/273 |
| 5,877,563 A * | 3/1999 | Krappel | ............ | H01H 39/006 180/271 |
| 6,141,202 A * | 10/2000 | Maeckel | ............ | H01H 85/46 337/143 |
| 6,295,930 B1 * | 10/2001 | Kume | ............ | H01H 39/006 102/202.5 |
| 6,351,361 B1 * | 2/2002 | Kawazu | ............ | H01H 85/463 337/290 |
| 6,411,190 B1 * | 6/2002 | Yamaguchi | ............ | H01H 39/00 180/279 |
| 6,445,276 B2 * | 9/2002 | Schon | ............ | H01H 85/46 337/184 |
| 6,759,760 B2 * | 7/2004 | Gaynier | ............ | H02J 9/002 307/10.7 |
| 6,954,132 B2 * | 10/2005 | Lell | ............ | H01H 39/006 337/157 |
| 7,222,561 B2 * | 5/2007 | Brede | ............ | B23D 15/145 200/61.08 |
| 7,286,037 B2 * | 10/2007 | Furuuchi | ............ | H01H 85/046 337/159 |
| 7,529,072 B2 * | 5/2009 | Nishikawa | ............ | H01H 37/761 361/103 |
| 8,432,246 B2 * | 4/2013 | Suzuki | ............ | H01H 39/006 337/157 |
| 9,019,678 B2 * | 4/2015 | Yeh | ............ | H02H 3/202 361/104 |
| 9,607,795 B2 * | 3/2017 | Jung | ............ | H02H 9/041 |
| 9,704,681 B2 * | 7/2017 | Fukuyama | ............ | H01H 39/006 |
| 10,661,656 B2 * | 5/2020 | Hammerschmidt | .. | B60L 3/0007 |
| 2004/0041682 A1 * | 3/2004 | Pasha | ............ | H01H 39/006 337/401 |
| 2005/0083165 A1 * | 4/2005 | Tirmizi | ............ | H01H 39/006 337/157 |
| 2008/0137253 A1 | 6/2008 | George et al. | | |
| 2010/0328014 A1 | 12/2010 | Suzuki et al. | | |
| 2011/0012704 A1 * | 1/2011 | Kimura | ............ | H01H 37/761 337/168 |
| 2013/0009745 A1 | 1/2013 | Hentschel | | |
| 2013/0126326 A1 | 5/2013 | Borg | | |
| 2014/0035359 A1 * | 2/2014 | Graf | ............ | B60R 16/033 307/9.1 |
| 2016/0211087 A1 * | 7/2016 | Minke | ............ | H01H 3/02 |
| 2016/0336131 A1 | 11/2016 | Fellmer et al. | | |
| 2018/0277325 A1 | 9/2018 | De Palma et al. | | |

FOREIGN PATENT DOCUMENTS

| | | | |
|---|---|---|---|
| CN | 106158509 A | 11/2016 | |
| DE | 102012013491 B3 | 9/2013 | |
| FR | 2797990 A1 * | 3/2001 | ......... H01H 85/0417 |
| GB | 1378328 A | 12/1974 | |
| WO | WO 2017/042321 A1 | 3/2017 | |

* cited by examiner

ELECTRIC FUSE ELEMENT, AND METHOD FOR OPERATING AN ELECTRIC FUSE ELEMENT

CROSS-REFERENCE TO RELATED APPLICATIONS

This application is the national phase entry of international patent application no. PCT/EP2018/075032 filed Sep. 17, 2018 and claims the benefit of German patent application No. 10 2017 125 208.8, filed Oct. 27, 2017, the disclosures of which are incorporated herein by reference in their entirety.

TECHNICAL FIELD

The subject matter relates to an electrical fuse element and a method of operating an electrical fuse element.

BACKGROUND ART

Due to the increasing electrification of motor vehicles, not only with regard to the drive train, but also with regard to the rising number of auxiliary consumers, not only do battery currents rise, but also increasingly higher voltage levels are reached. Very high battery voltages are required especially in the field of drive technology. This leads to constantly increasing demands on the respective fuse elements with regard to their maximum isolation currents, their dielectric strength and their error probability.

Especially in the event of a fault, for example after a crash, reliable disconnection or separation of the battery from the rest of the wiring harness in the vehicle must be ensured. Due to the high voltages, there are considerable risks for passengers and rescue personnel which must be reliably avoided. To reduce the probability of errors and increase the safety of a vehicle's electrical system, passive components are used in addition to active safety elements.

Active fuse elements are disconnectors that cut a line driven by a drive. The drive is controlled by pyrotechnics, for example. In particular, a disconnection signal can result in activation of the drive, whereupon the active disconnection element is disconnected.

Passive disconnecting elements are, for example, melt fuses, which must have, based on their operating principle, a certain internal resistance. If such melt fuses are connected in series with the load path, they generate a relatively high power loss. Since a certain electrical resistance must naturally be present in the melt fuses, power loss is unavoidable when using a melt fuse in the load path.

On the other hand, however, active disconnecting elements are susceptible to electric arcs due to their very fast mechanical separation of the load path. If an arc burns across the separation point, a high current can still flow and a safe separation of the on-board power supply from the battery is not guaranteed.

For this reason, the subject matter was based on the object of providing a fuse element which has a very low probability of failure with low resistance across the load path.

SUMMARY OF THE INVENTION

A switchable load path can be provided between the battery and the consumers, be it auxiliary consumers and/or the drive motor. A load path can be an electric line along which electric current flows through the fuse element.

A switchable fuse path may be provided in addition to the load path. A fuse path can be an electrical line along which electrical current flows through the fuse element. Because the fuse path is switchable, it can be de-energized during normal operation. In particular, the fuse path may be open in normal operation.

On the input side, the load path and fuse path can be short-circuited with each other, so that the fuse element has in particular one terminal on the input side. Load path and fuse path can branch off from this terminal. The fuse path and load path can also each have their own terminal on the input side. However, the fuse path and load path are then preferably short-circuited with each other within the fuse element.

On the output side, load path and fuse path can have separate terminal(s).

The one or more input terminal(s) (the input) of the fuse element are preferably connected to a battery pole, in particular the B+ pole or the B– pole of the battery.

The output-side terminal of the load path is connected to at least one load, in particular the drive train. The output-side terminal of the fuse path is connected to a battery pole with the opposite polarity with respect to the input-side terminal.

Since the fuse path is open during normal operation, i.e. it is currentless, there is no electrical connection between the input and the output of the fuse path and, in particular, there is no short circuit of the battery via the fuse path in this case.

It has now been recognized that safe disconnection, in particular avoiding an arc along the separation point of the load path, can be ensured by the load path and the fuse path being in mechanical connection with each other in such a way that an electrical opening of the load path causes an electrical closing of the fuse path and that a fuse arranged in the fuse path trips at the moment of closing of the fuse path.

According to the subject-matter, a combination of an active and passive component is made possible. The load path may contain an active component that actively opens the load path. At the same time the fuse path can be closed, which leads to a triggering of the passive component in the fuse path.

A high current is conducted through the fuse path at the moment of opening the load path. In particular, the current of the load path commutates to the fuse path. A possible current flowing for a short period across an arc via the load path's separation point may commutate to the fuse path.

In normal operation, the load path is a short circuit between the input and the output of the fuse element. The resistance across the load path is virtually zero, so that power dissipation is minimized in normal operation.

The fuse along the fuse path has an increased electrical resistance, but this resistance has no effect in normal operation because the fuse path is open in normal operation. No current flows through the fuse path during normal operation.

Only in the event of a fault, i.e. a short circuit, a crash and/or the defect of a battery or another fault, is the load path actively opened and the fuse path is closed by the mechanical between load path and fuse path. This closing of the fuse path leads to an activation of the fuse in the fuse path by the current commutating to the fuse path.

After the current is commutated onto the fuse path, which leads to a safe disconnection of the load path, the current in the fuse path is also disconnected directly by the fuse located therein. The fuse element thus ensures that the load connected to the load path terminal is reliably disconnected from the battery.

As already indicated, the load path has a separation point according to an embodiment. The separation point is in particular a taper, predetermined breaking point or similar. According to an embodiment, the separation point is also formed by a material-lock (bonding) between two interconnected separation lugs. The connection can be a soldered or welded joint. The lugs which form the separation point can face each other.

According to an embodiment, it is proposed that an activated disconnecting element disconnects the separation point and simultaneously closes the fuse path. The disconnecting element results in a mechanical connection between the separation point and the fuse path. For example, the disconnecting element can be made of at least two materials. It is possible that a first area of the disconnecting element is formed by an insulator and a second area of the disconnecting element is formed by a conductor. First, the disconnecting element with the insulator is placed in the fuse path and causes the fuse path to be open. If the disconnecting element is moved, the insulator can be moved in the direction of the separation point and at the same time the conductor of the disconnecting element short-circuits the fuse path.

It is also proposed that the disconnecting element has a mechanical drive. This is in particular a pyrotechnical drive. A pyrotechnic drive can be formed by a pyrotechnic squib which can be activated electrically. When the squib is activated, an explosion pressure is built up, which accelerates the disconnecting element. The disconnecting element can simultaneously cause both a disconnection of the load path at the separation point and a closing of the fuse path. This can be achieved in particular by a linear movement.

According to an embodiment, it is proposed that the disconnecting element has a disconnection slide. The disconnection slide is accelerated in particular by the drive in the direction of the separation point of the load path. At the same time, this movement of the disconnection slide will cause the fuse path to be closed. The disconnection slide can be a one- or two-part component. In particular, the disconnection slide is accelerated uniformly, i.e. all components of the disconnection slide are equally accelerated by the drive.

According to an embodiment, it is proposed that the disconnection slide is formed as a piston sliding in a housing. The housing may include the drive, the disconnection slide and the separation point. In particular, the housing can be closed by the separation point or the lugs forming the separation point. In the housing, the disconnection slide can be moved linearly. The piston is thereby moved in the housing in the direction of the separation point.

If there is a flowable medium in the housing between the disconnection slide and the separation point, this flowable medium is accelerated by the movement of the piston in the direction of the separation point. The flowable medium is preferably incompressible, so that the acceleration of the piston in the direction of the separation point leads to a bursting pressure being exceeded at the separation point and the separation point breaking up. This leads to a separation of the load path at the separation point. The flowable medium can extinguish any arc that may occur. The flowable medium can also be suitable for initially preventing the formation of the arc.

According to an embodiment, it is proposed that the disconnection slide has a connecting element. This connecting element may be suitable to close the fuse path. The connecting element can be moved mechanically by the drive between two taps of the fuse path. In normal operation the fuse path between the two taps is open. In particular, the isolator of the disconnection slide can be located between the taps. When activated, the disconnection slide is moved linearly. This can cause the insulator to move away between the taps and the connecting element to move between the terminals. This causes the connecting element to close the fuse path.

According to an embodiment, it is proposed that the disconnecting element has a flowable medium. As already explained, the flowable medium, which is particularly incompressible, can be accelerated by a drive in the direction of the separation point. This creates a pressure at the separation point, which leads to the separation of the separation point According to an embodiment, it is proposed that after activation of the drive, the taps of the fuse path are short-circuited by the connecting element. Then the current, which initially flows across the load path, can commutate to the fuse path.

According to an embodiment, it is proposed that the fuse in the fuse path is a melting fuse. If a sufficiently high current is flows across the melting fuse path, the melting fuse melts and separates the fuse path.

As the current commutates to the fuse path, the load path is first reliably disconnected. Then the fuse path is reliably opened by the melting fuse. The battery is then completely separated from the vehicle electrical system.

The fuse path can be connected as a short circuit between two poles of a battery. In normal operation the fuse path is open and the battery is therefore not short-circuited. However, when activated, the short circuit causes the resistance between the battery pole connected to the input terminal of the fuse element and the battery pole connected to the output terminal of the fuse path to be considerably lower than the resistance between the input terminal of the fuse element and the battery pole connected via the load path and the load. This results in safe commutation of the current from the load path, which is disconnected, to the fuse path and subsequent tripping of the fuse in the fuse path.

According to an embodiment, it is proposed that the load path is connected between one pole of a battery and at least one load connected to the other pole of the battery. In normal operation the load is thus supplied via the load path with very low power losses. The fuse element in the fuse path is inactive and de-energized. Only when activated, the fuse element in the fuse path is energized. This results in disconnection of the fuse path wherein safe disconnection by the fuse element is guaranteed.

According to an embodiment, it is proposed that the flowable medium is a liquid or a free-flowing bulk material, especially sand, and/or that the flowable medium is liquid, pasty, foamy, gel-like or granular. In particular, the flowable medium is incompressible.

In order to prevent or extinguish an electric arc at the separation point of the load path, the flowable medium has electrically insulating properties according to an embodiment. The flowable medium can also have arc-quenching properties.

Another aspect is a vehicle provided with an electrical energy source. A first pole of the energy source, formed as a vehicle battery, is connected to the input terminal of the fuse element. The other pole is connected on the one hand to the output terminal of the fuse path and on the other hand to the load connected to the output terminal of the load path. Thus a first circuit is formed via the first pole, the load path, the load and the second pole. A second, open circuit is formed via the first pole, the fuse path and the second pole. This second circuit is normally open and, as described above, is closed during activation, thus forming a short circuit across the two battery poles. This ensures the commutation of the current from the separation point to the fuse path.

In accordance with another aspect, a method for disconnecting a load path using an electrical fuse element is proposed. In fault operation, the load path is opened and the fuse path is closed at the same time. This causes the current flowing across the load path to commutate to the fuse path, thereby tripping a fuse located in the fuse path and opening the fuse path.

BRIEF DESCRIPTION OF THE DRAWINGS

In the following, the subject is explained in more detail by means of a drawing showing embodiments. In the drawing show.

DETAILED DESCRIPTION OF SPECIFIC EMBODIMENTS

Figure 1:
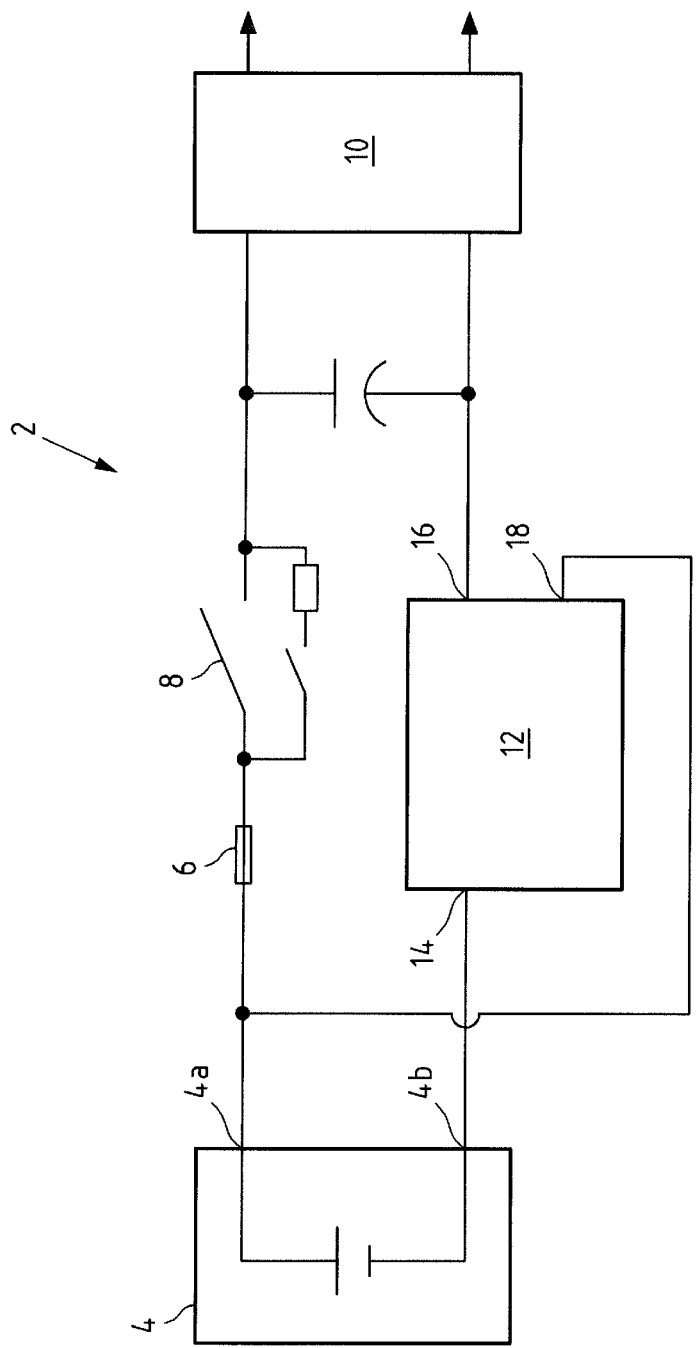
FIG. 1 an equivalent circuit diagram of a vehicle electrical system with a fuse element according to the subject matter.

FIG. 1 shows an equivalent circuit diagram of an on-board network 2 of a motor vehicle. A high-voltage battery 4 is shown as an example. The high-voltage battery 4 can in particular be a battery of a vehicle drive train. The B+ pole 4a of battery 4 is connected via a series resistor 6 and an "ignition switch" 8 to a drive train 10 as a load. During operation the switch 8 is closed.

The B− pole 4b is connected to the load 10 via the fuse element 12. The fuse element 12 has an input terminal 14 as well as a first output terminal 16 and a second output terminal 18. The load path is formed across the input terminal 14 and the output terminal 16. The fuse path is formed across the input terminal 14 and the output terminal 18. The output terminal 16 is connected to load 10 and the output terminal 18 is connected to the B+ pole 4a.

Figure 2A:
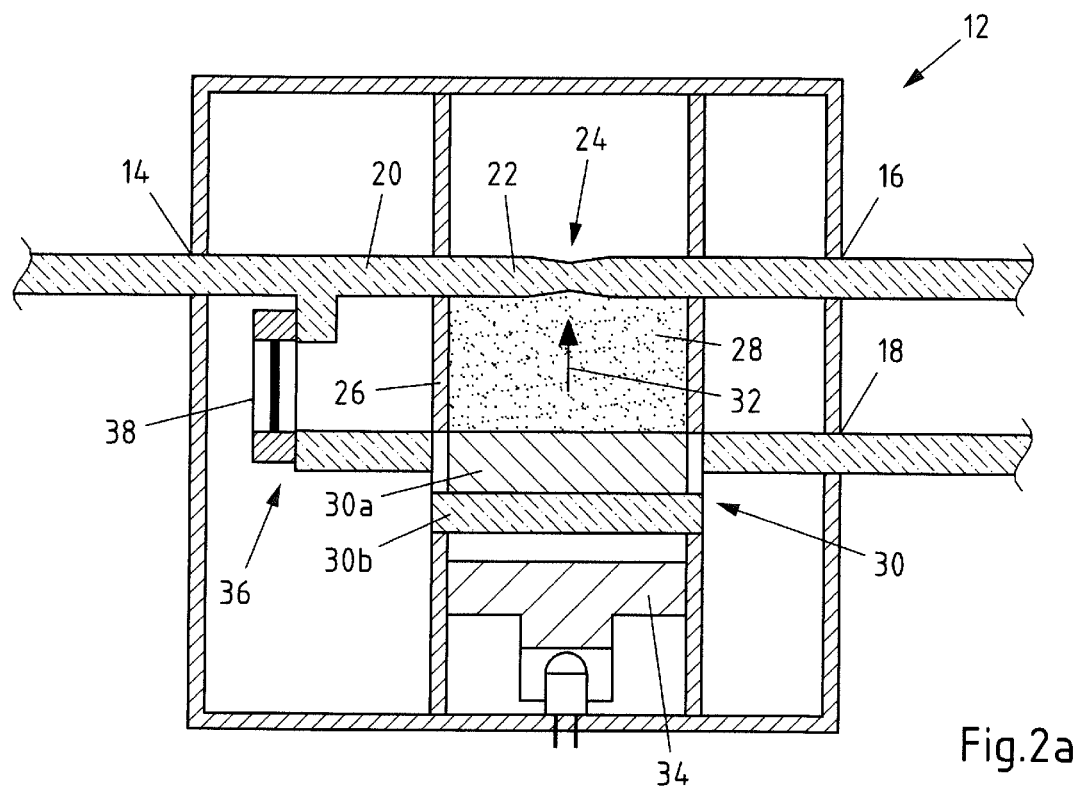
FIG. 2a a fuse element in normal condition according to the subject matter.

The fuse element 12 is shown in detail in FIG. 2a. Load path 20 connects input terminal 14 with output terminal 16. Load path 20 has a disconnecting element 22, on which a predetermined separation point 24 is located. The disconnecting element 22 closes a housing 26 in which a flowable medium 28 is arranged.

The housing 26 is formed in the manner of a channel in which a disconnection slide 30 is arranged. The disconnection slide 30 can be moved in direction 32. The disconnection slide 30 is formed in two parts from an insulator 30a and a conductor 30b.

In the channel, in front of the disconnection slide 30, a drive 34 is arranged, which is formed as a pyrotechnic drive.

When the drive 34 is activated, the disconnection slide 30 is accelerated in direction 32. This causes the flowable medium 28 to exert a pressure on the separation point 24 in such a way that it bursts. This is described below.

The safety path 36 is formed across the input terminal 14 and the output terminal 18. The disconnection slide 30 forms an electrical separation along the fuse path 36 by the insulator 30a. A melting fuse 38 is located in the fuse path 36.

Figure 2B:
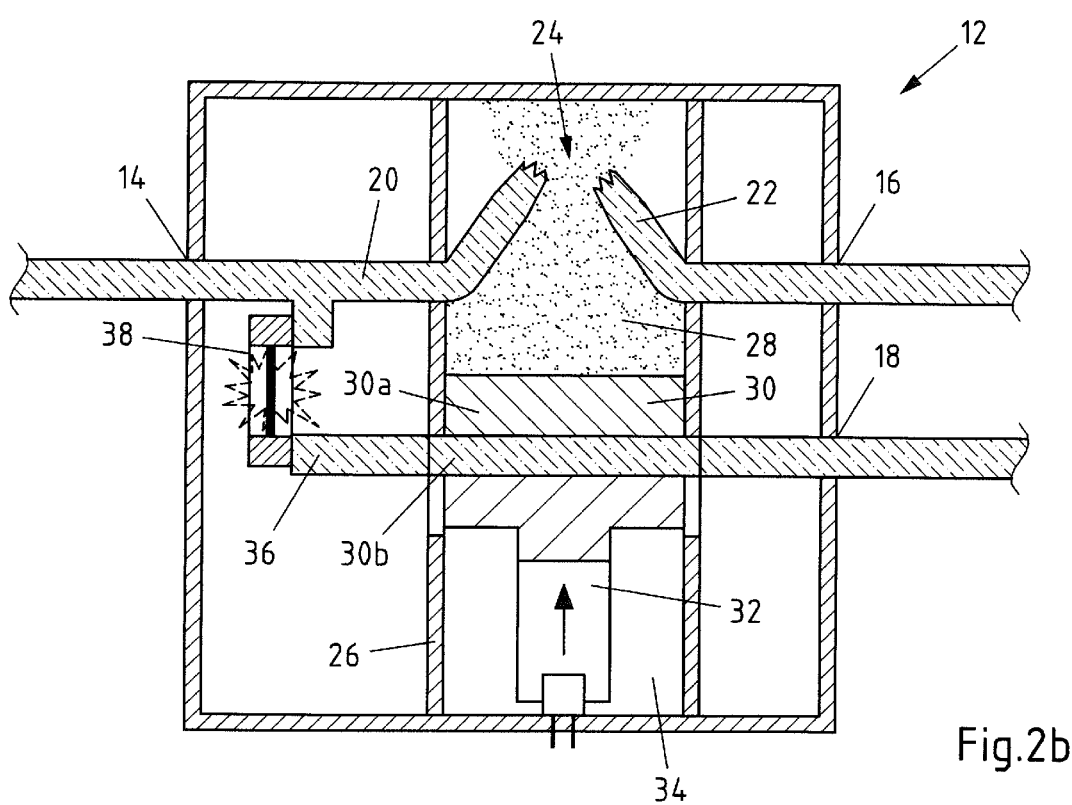
FIG. 2b a fuse element during activation.

FIG. 2b shows the fuse element 12 at the moment of activation. The drive 34 was activated by an external signal, for example an airbag control signal or similar. This causes a force to act on the disconnection slide 30 so that it is accelerated in the direction of 32. This causes the medium 28 to exert such a pressure on the disconnecting element 22, so that the predetermined separation point 24 bursts.

At the same time, the movement of the disconnection slide 30 in the housing 26 causes the conductor 30b to close the fuse path 36. This closing of the fuse path 36 leads to a short circuit between the input terminal 14 and the output terminal 18 and thus, as can be seen in FIG. 1, between the B+ pole 4a and the B− pole 4b of battery 4.

This short-circuit leads to a commutation of any current still flowing via the disconnecting element 22, for example via an arc, to fuse path 36. In fuse path 36, melting fuse 38 is activated via the commutated current. The melting fuse 38 melts and also disconnects the fuse path 36.

Figure 2C:
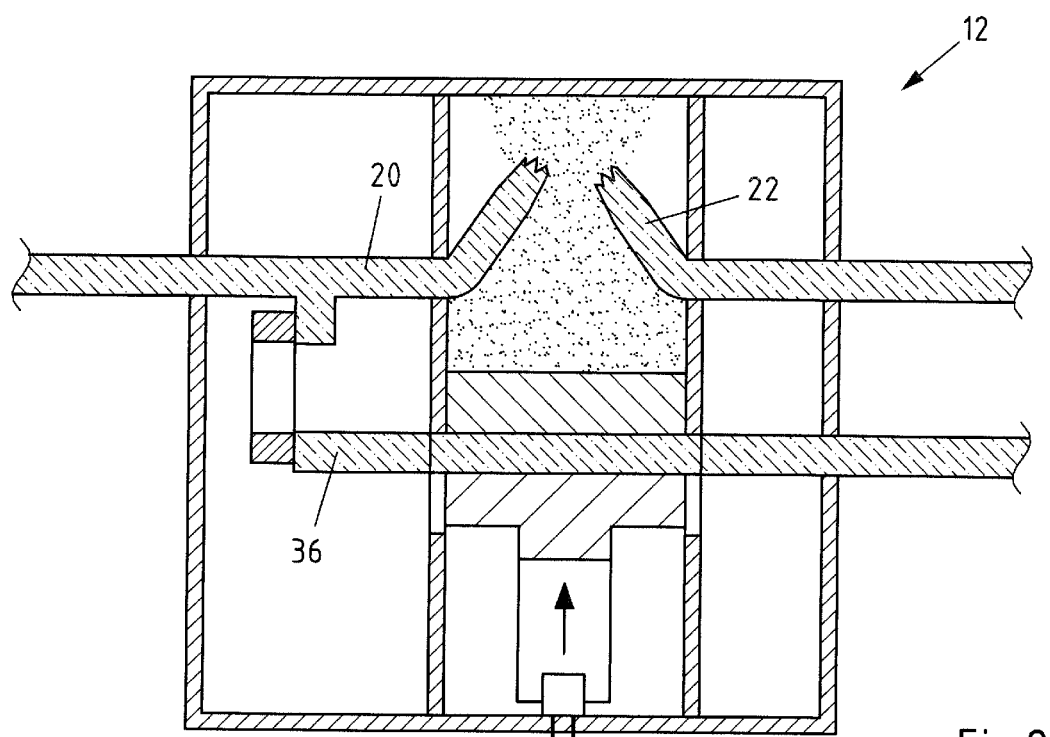
FIG. 2c a fuse element in the tripped state.

This leads to the situation in FIG. 2c, where it can be seen that both load path 20 and fuse path 36 are currentless. The load 10 is thus completely separated from battery 4.

REFERENCE SIGNS

2 Vehicle electrical system
4 High voltage battery
4a B+ pole
4b B− pole
6 Resistance
8 Switches
10 Load
12 Fuse element
14 Input terminal
16, 18 Output terminal
20 Load path
22 Disconnecting element
24 Separation point
26 Housing
28 Medium
30 Disconnection slide
30a Insulator
30b Conductor
32 Direction
34 Drive
36 Fuse path
38 Melting fuse

What is claimed is:

1. Electrical fuse element comprising,
a switchable load path having a separation point; and
a switchable fuse path, wherein the load path and the fuse path with their respective inputs are short-circuited with each other,
wherein the load path and the fuse path are in mechanical connection with one another in such a way that a mechanically driven disconnecting element is arranged to cause an electrical opening of the load path by separating the load path at the separation point and simultaneously causing an electrical closing of the fuse path and
a fuse arranged in the fuse path so as to trigger at the moment of closing of the fuse path,
wherein the disconnecting element has a disconnection slide which is accelerated by a drive in the direction of the separation point of the load path, the movement of the disconnection slide causing the fuse path to close.

2. Fuse element of claim 1,
wherein the disconnection slide is formed as a piston displaceable in a housing, the piston accelerating a flowable medium arranged at least between the separation point and the disconnection slide in the direction of the separation point.

3. Fuse element of claim 1,
wherein the disconnection slide has a conductor, the conductor being movable in-between two connections of the fuse path by the drive.

4. Electrical fuse element comprising,
a switchable load path having a separation point; and
a switchable fuse path, wherein the load path and the fuse path with their respective inputs are short-circuited with each other,
wherein the load path and the fuse path are in mechanical connection with one another in such a way that a mechanically driven disconnecting element is arranged to cause an electrical opening of the load path by separating the load path at the separation point and simultaneously causing an electrical closing of the fuse path and
a fuse arranged in the fuse path so as to trigger at the moment of closing of the fuse path,
wherein the disconnecting element comprises a flowable medium, the flowable medium being accelerated by a drive in the direction of the separation point and a pressure acting thereby on the separation point separating the separation point.

5. Fuse element of claim 3,
wherein the conductor short-circuits the connections of the fuse path after activation of the drive.

6. Fuse element of claim 4,
wherein the flowable medium is liquid, pasty, foamy, gel-like or granular.

7. Fuse element of claim 4,
wherein the flowable medium has electrically insulating properties and/or has arc-quenching properties.

8. Fuse element of claim 4,
wherein the flowable medium is a free-flowing bulk material.

* * * * *